United States Patent
Crossman et al.

(10) Patent No.: US 7,195,312 B2
(45) Date of Patent: Mar. 27, 2007

(54) PIVOTING ARMEST FOR ENHANCING SIDE IMPACT PROTECTION

(75) Inventors: Mark W Crossman, Oakland Township, MI (US); Rajkumar Rajagopalan, Sterling Heights, MI (US); Sharath Varadappa, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/182,403

(22) Filed: Jul. 15, 2005

(65) Prior Publication Data

US 2007/0013220 A1  Jan. 18, 2007

(51) Int. Cl.
*B60N 2/46* (2006.01)
(52) U.S. Cl. .................. 297/216.1; 297/115
(58) Field of Classification Search ......... 297/216.1, 297/411.2, 411.3, 411.32, 411.33, 227, 411.37, 297/115, 116, 117
See application file for complete search history.

(56) References Cited

U.S. PATENT DOCUMENTS

| | | | |
|---|---|---|---|
| 3,400,979 A * | 9/1968 | James .................. 297/411.21 |
| 3,888,540 A * | 6/1975 | Protze et al. ............... 297/486 |
| 4,131,315 A * | 12/1978 | Vogtherr ..................... 297/286 |
| 4,917,438 A * | 4/1990 | Morgan ................. 297/411.37 |
| 5,114,212 A * | 5/1992 | Verney et al. ......... 297/411.33 |
| 5,290,087 A * | 3/1994 | Spykerman ................. 296/153 |
| 5,941,599 A * | 8/1999 | Roberts ...................... 297/115 |
| 6,142,563 A * | 11/2000 | Townsend et al. ....... 297/216.1 |
| 6,386,635 B1* | 5/2002 | Ralph ...................... 297/344.1 |
| 6,604,789 B1* | 8/2003 | Downing .................... 297/227 |
| 6,709,063 B1* | 3/2004 | Furukawa ................... 297/488 |

\* cited by examiner

*Primary Examiner*—Milton Nelson, Jr.
(74) *Attorney, Agent, or Firm*—Neil S. Butler

(57) ABSTRACT

An armrest assembly for a motor vehicle seat having a first support member pivotably mounted to a seat structure, a second support member rotatably mounted to the first support member, and a biasing arrangement positioned relative to the first and second support members. The biasing arrangement exerts a predetermined biasing force on the second support member to prevent the second support member from rotating relative to the first member until a sufficient load force is applied to the armrest to overcome the biasing threshold.

12 Claims, 3 Drawing Sheets

PIVOTING ARMREST FOR ENHANCING SIDE IMPACT PROTECTION

FIELD OF THE INVENTION

The present invention relates to an armrest assembly for a motor vehicle seat, and specifically to an armrest assembly for a motor vehicle seat adapted for improved occupant protection during a side impact.

BACKGROUND OF THE INVENTION

Automotive vehicle seat assemblies typically have a seat, a seat back and an armrest attached to the seat back to provide a surface on which the vehicle occupant may rest their elbow or forearm. Known armrests, such as the armrest 10 shown as prior art in FIG. 1, are typically connected to a pin which is in turn pivotably attached to the seat back such that the armrest can rotate in an arc with respect to the seat back between a raised, stored position and a lowered, use position. As a result, armrests must possess sufficient rigidity and strength to withstand the loads applied during everyday use of the vehicle.

In recent years, many efforts have been made reduce potential injury to vehicle occupants during a side impact event. While these efforts have resulted in significant improvements in passenger safety, there exists a desire to further improve passenger safety during a side impact event. It is difficult, however, to design and manufacture an armrest that is structurally strong enough to withstand the type of loads to which it may be subjected during everyday use and that is also capable of deforming so as to reduce injury in a crash.

SUMMARY OF THE INVENTION

Accordingly, one aspect of the present invention is to provide an armrest assembly that has sufficient strength and rigidity to withstand the loads applied during everyday use but that is capable of decreasing the likelihood and/or severity of injury to an occupant during a side impact event in which the armrest forcefully strikes the vehicle occupant.

Another aspect of the present invention is to provide an armrest assembly that is cost effective to manufacture and comfortable to use.

In accordance with the foregoing aspects of the invention, an armrest assembly is provided having a first support member pivotably mounted to a seat structure, a second support member rotatably mounted to the first support member, and a biasing arrangement positioned relative to the first and second support members. The biasing arrangement exerts a predetermined biasing force on the second support member to prevent the second support member from rotating relative to the first member until a sufficient load force is applied to the armrest to overcome the biasing threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
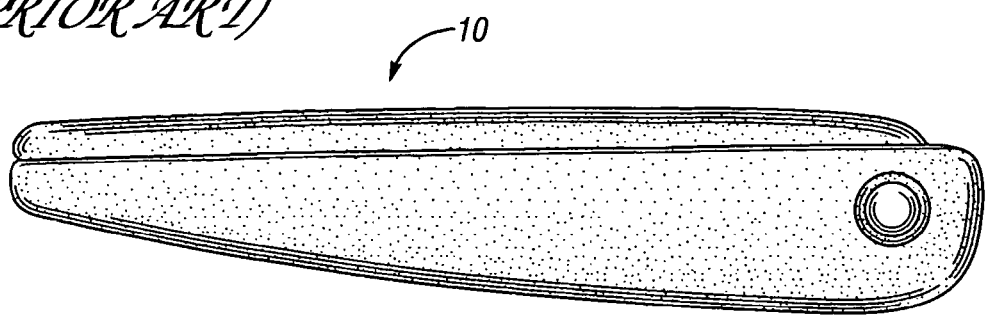
FIG. 1 is a side view of an armrest for use with a seat for a motor vehicle as is known in the prior art.
Figure 2:
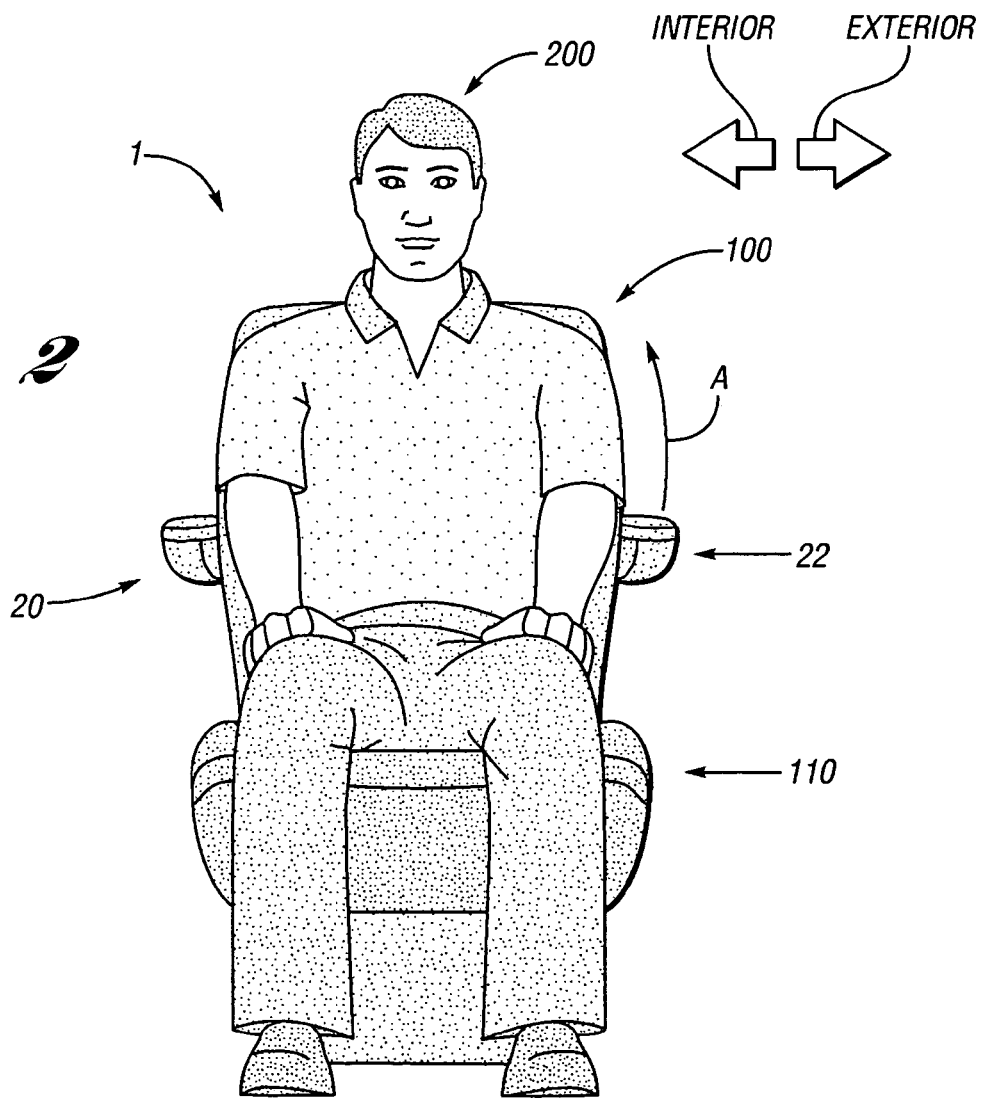
FIG. 2 is a front view of a passenger seat in a seat assembly having a pivotal armrest according to the present invention.

Turning now to the drawings, FIG. 2 shows a passenger 200 in a sitting position in a seat assembly 1. The seat assembly includes a seat 110 attached to a seat back 100. The seat assembly 1 further includes armrests 20, 22 which are each attached to a pin (not shown). The pin is pivotally attached to the seat back 100 such that the armrests 20, 22 may be rotated in the direction of arrow A, in an arc relative to the seat back 100 between a raised, stored position aligned in the substantially vertical plane of the seat back 100 and a lowered, use position aligned substantially perpendicular to the seat 110. The seat assembly 1 may be of conventional design wherein the seat back 100 is pivotally coupled to the seat 110 to permit the seat back 100 to be folded down on top of the seat 110.

Figure 3:
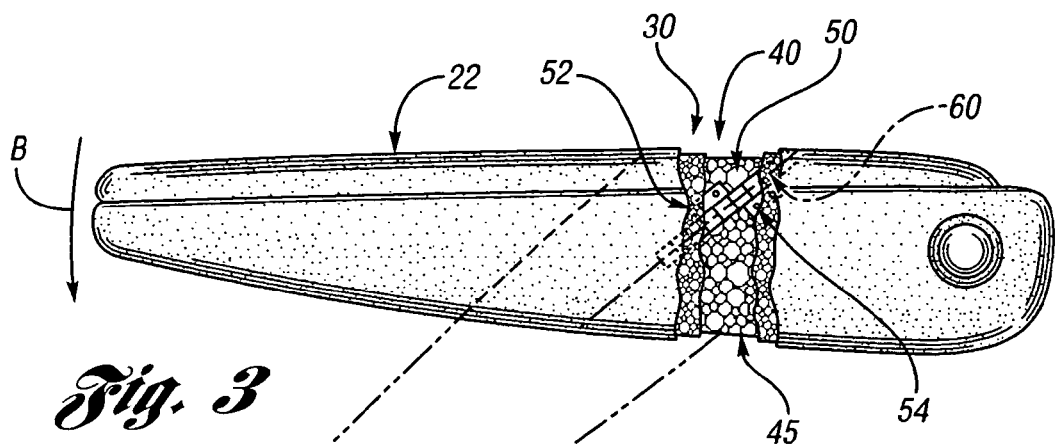
FIG. 3 is a side, partially sectioned view of a pivotal armrest according to the present invention.
Figure 5:
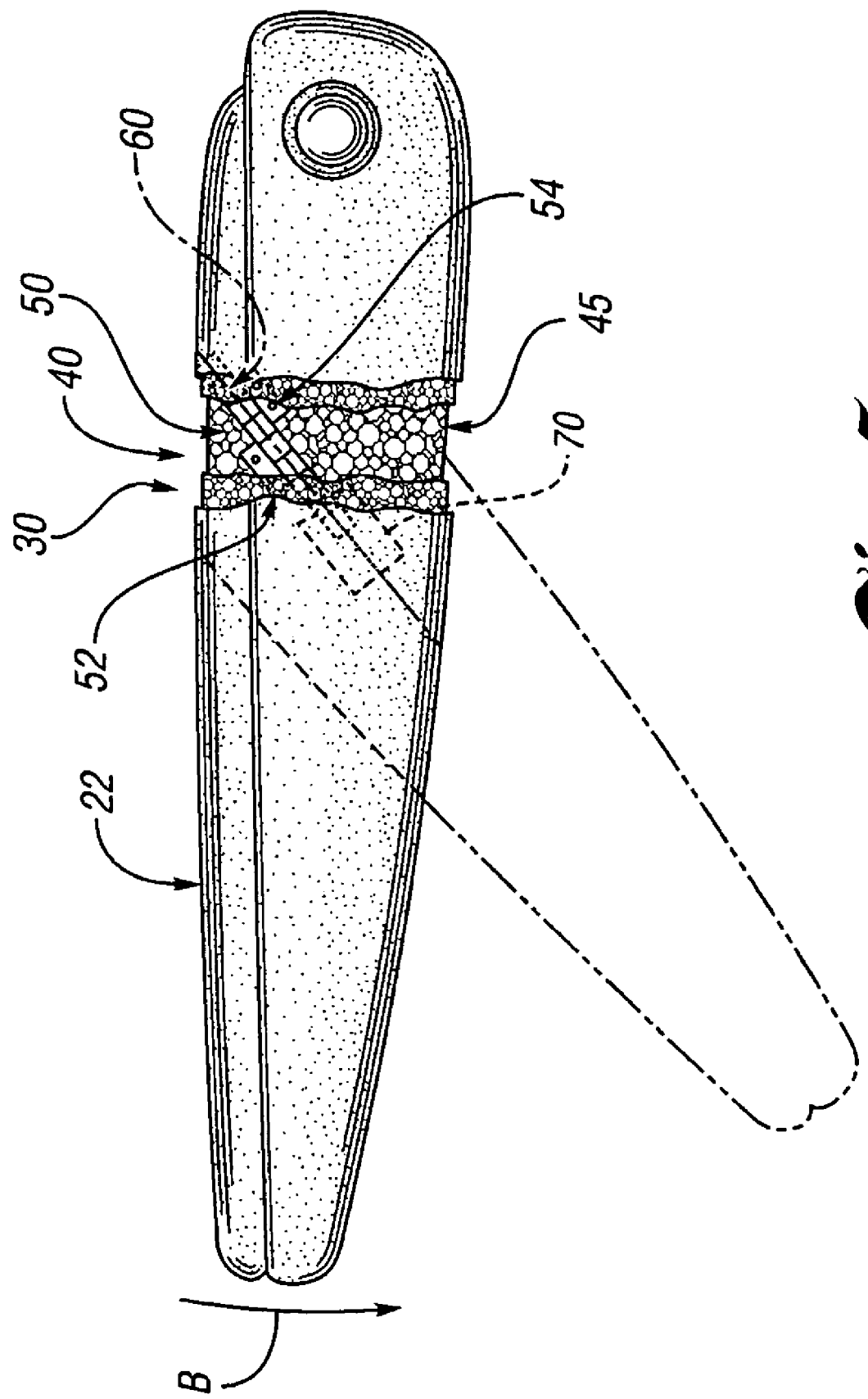
FIG. 5 is a side, partially sectioned view of a pivotal armrest according to the present invention.

FIG. 3 shows an armrest 22 according to an exemplary embodiment of the present invention. Armrest 22 includes a first support member 45 and a second support member 40 which may be made of any structurally rigid material to which a suitable mounting structure (not shown) and pin may be mounted for attaching the armrest 22 and pin to the seat back in a conventional manner. In an exemplary embodiment the first and second support members may be constructed of a resilient polymeric material. The armrest also includes a pin and loop-type hinge 50, having brackets 52 and 54 for attaching the hinge 50 to the first support member 45 and second support member 40. The hinge 50 is oriented in a diagonal direction with respect to the vertical axis of the vehicle and attached to the first support member 45 and second support member 40. The hinge 50 is arranged to align the first support member 45 and second support member 40 to form a continuous core structure when the armrest is in its initial non-collapsed state. In a first exemplary embodiment, the first support member 45 and second support member 40 are constructed as a single member having an integral tear seam 60 aligned with the hinge 50. As shown in FIG. 5, in a second exemplary embodiment, the armrest 22 further includes a plate 70 with an integral tear seam attached to the first support member 45 and second support member 40 on the side of the armrest 22 opposite the hinge 50. In either exemplary embodiment, the armrest 22 also includes a cover 30, preferably made from an elastically deformable cushion material (such as a foam substrate) that may be upholstered with cloth, leather or any other material known in the art and designed to enclose the armrest 22 for user comfort and aesthetic appeal.

Figure 4:
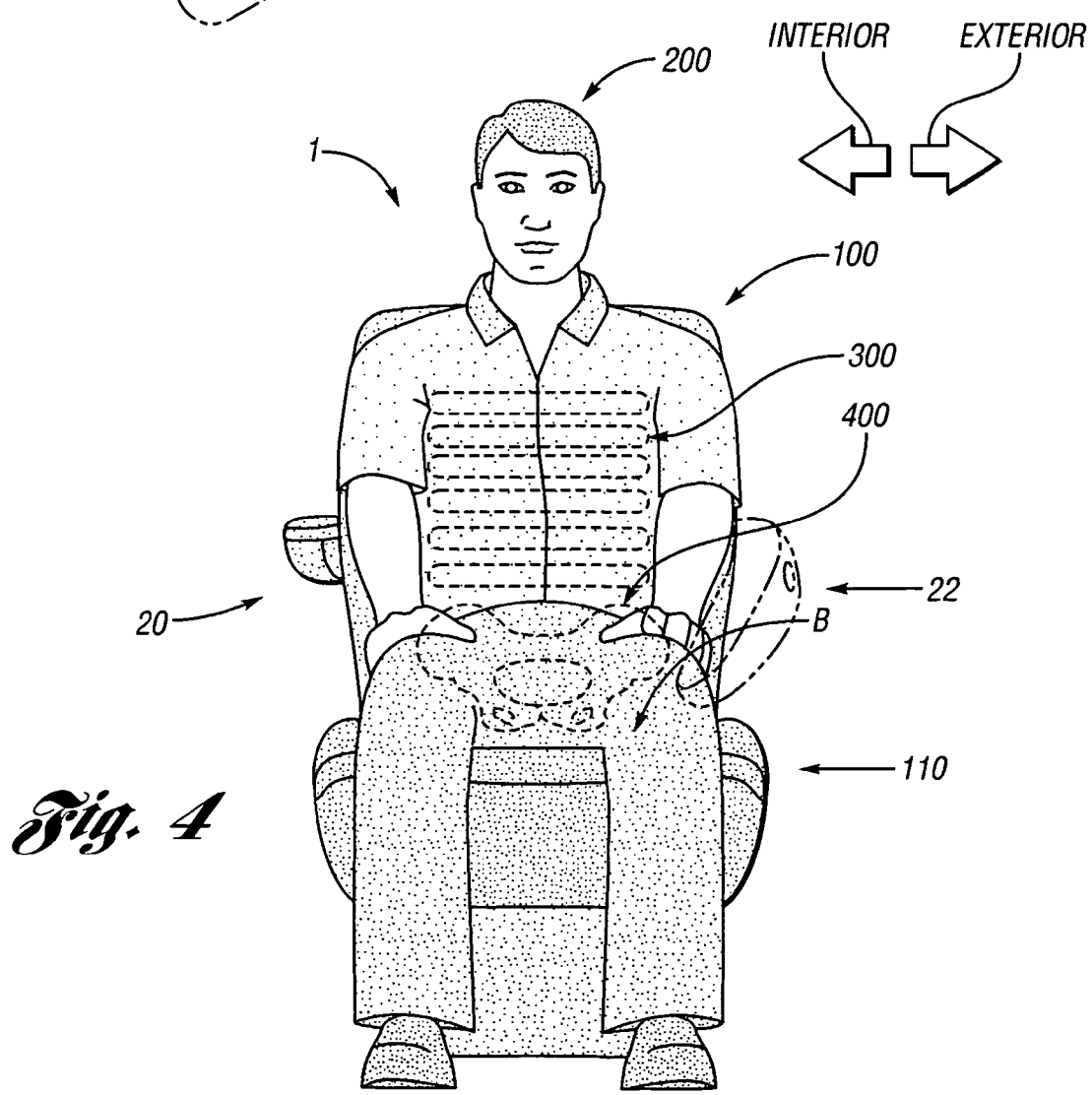
FIG. 4 is a front view of a seat having a pivotal armrest in the collapsed position according to the present invention.

FIG. 4 shows the operation of a seat assembly 1 having a armrest 22 in accordance with the present invention in response to a side impact event. When the vehicle experiences a side impact event of adequate severity to cause the vehicle door trim panel (not shown) to intrude into the proximity of the seat 110, seat back 100 and armrest 22, the armrest 22 will remain structurally rigid until the armrest 22 experiences a load greater than a pre-determined amount. When the side impact event results in a load greater than such a pre-determined amount being placed on the armrest 22, the collapsing member 40 will rotate about the diagonal axis of the hinge 50 in the direction of arrow B with respect to the first support member 45. The resulting movement of the armrest 22 in the direction of arrow B will rotate the armrest 22 in a downward and lateral motion away from the abdominal and thoracic region 300 and towards the pelvic region 400 of the passenger 200. For example, such rotation could be approximately 60 degrees relative to the non-collapsed longitudinal axis of armrest 22 when deployed in the use position. Accordingly, the armrest 22 transfers thoracic and abdominal loading during a side impact event to the pelvic region. This transfer of loading is desirable during a side impact event as recent studies have shown the pelvic region is capable of withstanding greater loading prior to significant trauma than the abdominal and thoracic regions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An armrest assembly for a motor vehicle seat capable of reducing thoracic and abdominal loading on a vehicle passenger during a side impact event, comprising:
    a first support member pivotably mounted to a seat structure;
    a second support member rotatably mounted to the first support member;
    a biasing arrangement positioned relative to the first and second support members so as to exert a predetermined biasing force on the second support member to prevent the second support member from rotating relative to the first support member until a sufficient load force is applied to the armrest to overcome the biasing threshold; and
    wherein when the biasing threshold is overcome, the second support member rotates in a downward and lateral motion to transfer thoracic and abdominal loading during a side impact to the pelvic region of said vehicle passenger.

2. The armrest assembly of claim 1 wherein said first and second support members are constructed of a resilient polymeric material.

3. The armrest assembly of claim 1 further comprising a cover constructed of an elastically deformable cushion material and arranged to enclose said armrest assembly.

4. The armrest assembly of claim 1 wherein a hinge mechanism rotatably attaches said second support member to said first support member.

5. The armrest assembly of claim 1 wherein said biasing arrangement is a plate attached to said first and second support members and having an integrally formed tear seam.

6. The armrest assembly of claim 1 wherein said first and second support members are constructed as one support member and said biasing arrangement comprises a tear seam integrally formed with said support member.

7. A seat assembly for a motor vehicle capable of reducing thoracic and abdominal loading on a vehicle passenger during a side impact event, comprising:
    a seat attached to a floor of a vehicle;
    a seat back attached to said seat;
    an armrest attached to one of said seat or said seat back;
    said armrest having a first support member pivotably mounted to a seat structure;
    a second support member rotatably mounted to the first support member;
    a biasing arrangement positioned relative to the first and second support members so as to exert a predetermined biasing force on the second support member to prevent the second support member from rotating relative to the first support member until a sufficient load force is applied to the armrest to overcome the biasing threshold; and
    wherein when the biasing threshold is overcome, the second support member rotates in a downward and lateral motion to transfer thoracic and abdominal loading during a side impact to the pelvic region of said vehicle passenger.

8. The seat assembly of claim 7 wherein said first and second support members are constructed of a resilient polymeric material.

9. The seat assembly of claim 7 further comprising a cover constructed of an elastically deformable cushion material and arranged to enclose said armrest.

10. The seat assembly of claim 7 wherein a hinge mechanism rotatably attaches said second support member to said first support member.

11. The seat assembly of claim 7 wherein said biasing arrangement is a plate attached to said first and second support members and having an integrally formed tear seam.

12. The seat assembly of claim 7 wherein said first and second support members are constructed as one support member and said biasing arrangement is a tear seam integrally formed with said support member.

* * * * *

UNITED STATES PATENT AND TRADEMARK OFFICE
CERTIFICATE OF CORRECTION

| | | |
|---|---|---|
| PATENT NO. | : 7,195,312 B2 | Page 1 of 1 |
| APPLICATION NO. | : 11/182403 | |
| DATED | : March 27, 2007 | |
| INVENTOR(S) | : Crossman et al. | |

It is certified that error appears in the above-identified patent and that said Letters Patent is hereby corrected as shown below:

<u>Title Page</u>:

Item (54) Title: PIVOTING ARMEST FOR ENHANCING SIDE IMPACT PROTECTION

Should be: *PIVOTING ARMREST FOR ENHANCING SIDE IMPACT PROTECTION*

Item (74) Attorney, Agent, or Firm – Neil S. Butler

Should be: *N. Sean Butler*

Signed and Sealed this

Twenty-first Day of August, 2007

JON W. DUDAS
*Director of the United States Patent and Trademark Office*